United States Patent [19]

Wichterle et al.

[11] 4,205,452
[45] Jun. 3, 1980

[54] MEASURING SET FOR DETERMINATION OF THE SAGITTAL DEPTH AND THE AVERAGE CENTRAL CURVATURE OF GEL CONTACT LENSES

[75] Inventors: Otto Wichterle, Prague; Jiří Švantner, Unhošť, both of Czechoslovakia

[73] Assignee: Ceskoslovenska akademie ved, Prague, Czechoslovakia

[21] Appl. No.: 944,398

[22] Filed: Sep. 21, 1978

[30] Foreign Application Priority Data

Sep. 30, 1977 [CS] Czechoslovakia .................... 6354-77

[51] Int. Cl.² .......................... A61B 5/08; G01B 7/26; G01B 7/28
[52] U.S. Cl. ................................ 33/174 A; 33/169 B; 33/200
[58] Field of Search ................ 33/174 A, 200, 169 B, 33/172 E, 143 L; 356/124, 127; 33/178 D

[56] References Cited

U.S. PATENT DOCUMENTS

| | | | |
|---|---|---|---|
| 3,844,047 | 10/1974 | Carson | 33/172 E |
| 3,848,339 | 11/1974 | Strasbaugh | 33/174 A |
| 3,861,048 | 1/1975 | Thompson | 356/124 |

*Primary Examiner*—Willis Little

[57] ABSTRACT

The invention pertains to a measuring set for determination of the sagittal depth and the average central curvature of soft contact lenses which consists of two measuring units based on the principle of depth gauges and the common electronic indication part. The apparatus serves for rapid and inexpensive selection of the correct contact lens according to the shape and peculiarities of the patient eye. Each measuring unit consists of a fixed part formed by a support plate, a stable conductive hollow screw, and a coaxially fitted conductor insulated from the screw and protruding above the insulation, and a movable part formed by a conductive nut bearing an insulation bushing for the protruding conductor and a scale and put on the screw.

8 Claims, 4 Drawing Figures

MEASURING SET FOR DETERMINATION OF THE SAGITTAL DEPTH AND THE AVERAGE CENTRAL CURVATURE OF GEL CONTACT LENSES

BACKGROUND OF THE INVENTION

The present invention pertains to the measuring set for determination of the sagittal depth and the average central curvature of gel contact lenses in the swollen state.

Besides the measurement of refraction of soft contact lenses in their optical zone, it is also important for their application to measure their entire shape. It is suitable, for the rational selection of an optimum lens according to individual pecularities of the patient eye, to ascertain at least the fundamental indices of the shape of the inner arch of lens, i.e. the sagittal depth of lens of the one hand, and the average inner curvature of the central part of lens on the other, that is of that part which exceeds its optical zone and reaches to the eye limbus or the average curvature from the centre up to the diameter of about 10 mm.

In addition to optical methods, a method using the known principle of depth gauge was suggested for this purpose and apparatuses were developed where a metal needle is slowly slid into a lens freely placed on a circular edge of the given diameter by means of an electric motor drive as far as to the contact with lens centre.

The drive is stopped and the inertial motion of needle is braked with the simultaneous indication of needle position on an indicator in the moment of contact by a conductance signal by means of a relay system.

This equipment is rather costly and virtually inaccessible for numerous distributors of gel contact lenses. In addition to this, for the correct selection of contact lens according to the shape of patient eye, more than one shape parameter of lens must be measured, since differences take place, in addition to the size of eye, also in the shape of cornea and the adjacent sclera. Therefore the present invention solves the characterization of a gel contact lens by means of a simple set with one measuring unit serving for measurement of the sagittal depth of lens and the other unit for the average curvature of lens in its central corneal part. Combination of both these units in one apparatus is advantageous above all because the relatively expensive indication electronic equipment serves for both units. The measurement is so rapid that drying of a lens during both measurements is negligible. Consequently, the real values of one and the same lens are measured.

According to the invention, the information about the shape of lens can similarly be attained rapidly and reliably by means of a substantially simple and several times cheaper equipment, while the resolution power of this equipment corresponds to the limits of accuracy given by the nature of thin object of soft material, i.e. of a typical gel contact lens which is in addition to it wetted with water.

SUMMARY OF THE INVENTION

The invention pertains to the measuring set for determination of the sagittal depth and the average curvature of gel contact lenses by means of depth gauges with a conductance indication comprising two measuring units, each of them consisting of a fixed part, formed by a support plate, which is provided by an adjustable electrically conductive hollow screw coaxially within the cavity of the screw is located a conductor, which is fixedly secured by means of electrically nonconductive material, the fixed conductor protrudes above the nonconductive material. A mobile member, formed by an electrically conductive nut and a radially extending disk is threaded over the conductive screw. A non-conductive bushing is threaded in the nut and form an insulated member through which the protruding end of the conductor extends. The radial disk is equipped with a scale. The disk having the scale is advantageously provided with a stop which permits its rotation to an incomplete single revolution only. In the first unit, the upper plane of nut forms a surface for placing of the measured lens. In the second unit, the upper area of nut is adapted as a ring, the upper circular edge of which has the diameter corresponding to the diameter of the corneal part of a contact lens and it forms the seat therefor. The conductors of both measuring units and the conductive nuts are interconnected with an electronic conductance indicator. The electronic conductance indicator is advantageously formed by a flip-flop amplifier which has its input connected with the measuring units and its outputs connected with the corresponding indicator and with the input of an inverters, which has its output connected with the indicators, while the indicators and the measuring units are connected to a switch for the change-over of their function. The screw of the first unit has advantageously a lead of 1-2.5 mm per a revolution. The mutual position of the revolving part and the protruding part of conductor is arranged in such way that the distance of the protruding part of conductor from the plane of support plane is, within the limits of one revolution, 4.5 mm at utmost. The second measuring unit has a screw lead of 0.6 to 1.25 mm and the mutual position of the fixed and revolving parts is adjusted such that the distance of the protruding part of conductor from the plane of support edge is 2.7 mm at utmost. The scale of the first unit is advantageously adapted so that the fixed indicator shows the height of the protruding end of conductor - tip - above the support and the scale of the second unit so that the fixed indicator shows on the revolving scale the radius of a hypothetic sphere, the spherical cap of which has the base of the same diameter as is the diameter of the revolving supporting circular edge of the ring and which should have the same height as is the distance of the protruding end (tip) of conductor from the plane of the support edge.

The invention is further illustrated in its detail by means of a real example using the drawings.

DESCRIPTION OF THE INVENTION

Figure 1:
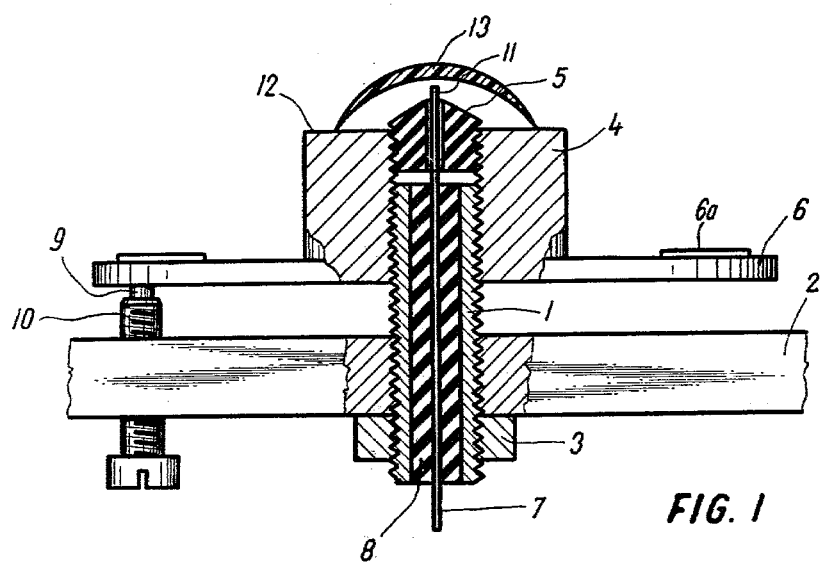
FIG. 1 is a side view partially in section of the first measuring unit for measuring of the sagittal depth of lens.

The first measuring unit is shown in FIG. 1 and consists of the electrically conductive hollow screw 1 anchored in a support plate 2, by the lock nut 3. A screw stop 9 is located in the support plate 2, extending upwardly toward the bottom surface of the disk 6 which is provided with a fixed pin 10. Rotation of the disk is thus limited to somewhat less than a single rotation. A nut 4 is threaded on the hollow screw 1 and has fixed thereto a disk 6 which carries the marked or attached scale 6a. Through the axis of the cavity of the hollow screw 1 passes the conductor 7, advantageously a wire fixed securely to the hollow screw 1 by means of the electrically non-conductive bushing 8, for example, by a case, or by the insertion of a insulating sealing material. The thread of the hollow screw 1 ends in the nut 4, which is closed on the top by a separate bushing 5 formed also of insulation material. The conductor 7 loosely passes through this bushing 5 so that its position is not effected by rotation of the nut 4. The nut 4 is connected in operation with the disk 6, which is provided with the scale, for rotation about the screw 1 which is itself fixed by the lock nut 3. The distance between the protruding end—the tip 11 of the conductor 7 (wire) and the upper plane 12 of the nut 4 ranges within the extreme values corresponding to the extreme values occuring in sagittal depths of soft contact lenses i.e. within the limits 2.5 and 4.5 mm, or within the range twice as broad at the utmost. The lead of the thread of hollow screw 1 is adapted to this fact. The conductive connection between the tip 11 and the plane 12 of nut 4 or with the conductive connected screw 1 or nut 3 takes place as soon as the tip touches the centre of the concave surface lens 13 which is freely placed on the plane 12.

Figure 2:
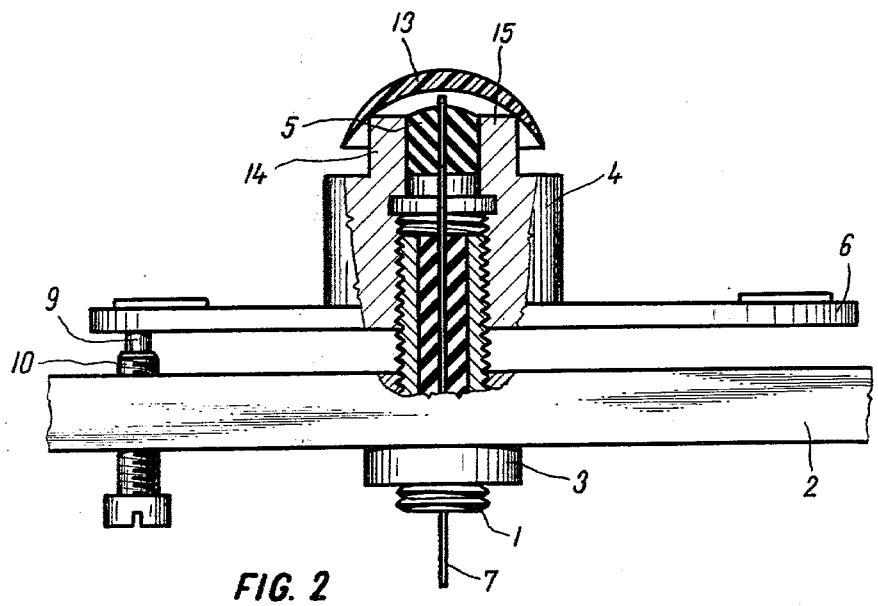
FIG. 2 is a view similar to FIG. 1 of the second measuring unit for measuring of the average curvature in its central corneal part.

The second measuring unit (FIG. 2) differs from the first one in principle only by the form of nut 4, which is provided by the electrically conductive ring 14. The bushing 15 is anchored (e.g. pressed) in the metal ring 14, which advantageously forms one body with the nut 4 and the circular upper edge 15 of which has the diameter corresponding to the diameter of the corneal part of contact lens, i.e. 9 to 11 mm. The mutual position of revolving and fixed parts is adjusted similarly as in the first measuring unit in such a way that the distance between the tip 11 of conductor 7 and the plane of edge 15 just exceeds the extreme limits of the sagittal depth of contact lenses below the corneal diameter at the full rotation, i.e. to allow changing of this distance by rotation of the nut with scale at least in the range 1.5 to 2.3 mm.

The fixed tip and the movable support on which the lens rests is advantageous, because the drive of the support which is directly connected with the scale is substantially simpler, more rugged and more precise than the drive of a needle. Another advantage of this arrangement consists in the fact, that the lens rotates during measurement and it is apparent at first sight whether it is placed centrally.

Figure 3:
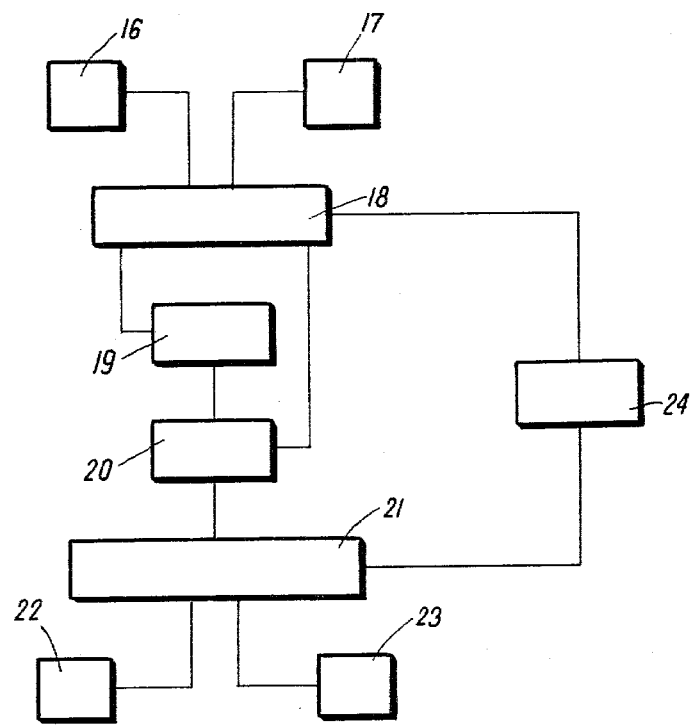
FIG. 3 is a block diagram of the electronic system.
Figure 4:
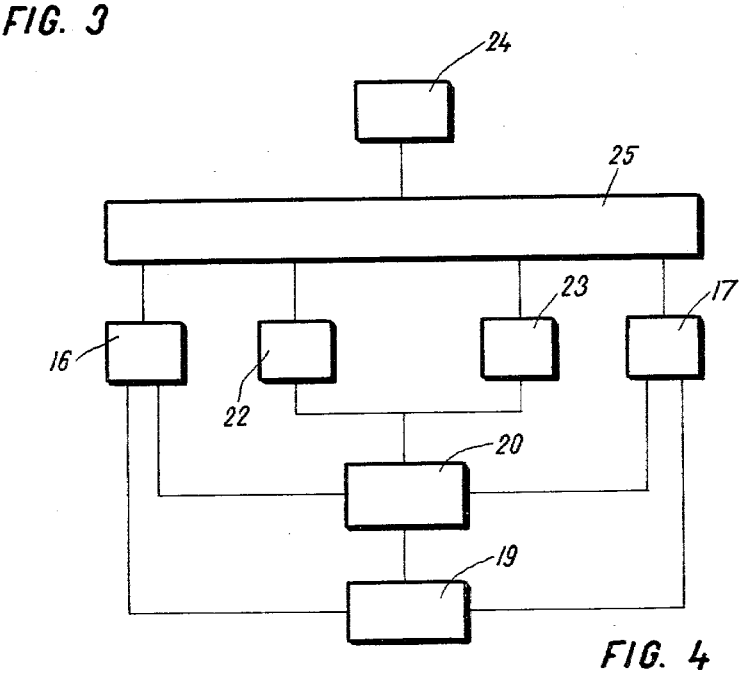
FIG. 4 is a block diagram of a simplified electronic system.

The common electronic system of the measuring set serves for the indication of the state of both measuring units and is shown in FIGS. 3 and 4. The electronic system of the measuring set allows the indication of the contact between the protruding end tip 11 of conductor 7 and the concave surface of the contact lens 13 freely placed on the plane 12 (see FIG. 1), or between the tip 11 and the plane of edge 15 (see FIG. 2).

Indication of the state of measuring units (the tip 11 in contact with the contact lens or not) is carried out by a light signal 16 or 17 having one pilot lamp lighting at the pertinent measuring unit 22 or 23 corresponding to any of the mentioned states. Switches 18 and 21 (FIG. 3) or the combined switch 25 connected respectively to a source of current 24 serve to effect the change-over of the electronic system to the chosen measuring unit. A signal from the measuring unit 22 or the measuring unit 23 is processed in a flip-flop amplifier 20 and phase invertor 19 which controls the indicators 16 and 17.

In the diagram shown in FIG. 3, the measuring units 22 and 23 are connected through the switch 21 with the flip-flop amplifier 20. The outputs of the flip-flop amplifier 20 are connected through the switch 18 with the indicators 16 and 17 and the input of inverters 19, the output of which is also connected through the switch 18 with the indicators 16 and 17.

The switches 18 and 21 are advantageously mechanically bound in such way that they are operated at the same time, e.g. by the single lever operation and the like.

In the arrangement accordingto FIG. 4, which shows a simplified example of application of the electronic part of the measuring set, it is used the combined switch 25, which is placed, in contrast to the switches 18 and 21 in the general diagram in FIG. 3, between the source of direct voltage 24 and the feeding points of measuring units 22 and 23 and of the state indicators 16 and 17. The output points of measuring units 22 and 23 are interconnected and connected to the input of flip-flop amplifier 20, the outlets of which are directly connected with the switching points of indicators 16 and 17 and with the inputs of invertor 19, the outputs of which are connected to the remaining switching inputs of indicators 16 and 17.

In comparison with the general diagram of the electronic system of FIG, 3, the location and the type of switches are changed (originally two switches 18 and 21, into a combined switch 25) and some simplification is attained in this way. The operating principle is the same in both cases (FIG. 3 and FIG. 4) and consists in the processing of a low-level signal from the measuring units 22 and 23 in the flip-flop amplifier 20 and the invertor 19 and its indication by two-lamp indicators 16 and 17. The contact of tip 11 with the lens 13 is indicated by lighting of the lamp connected to the output of invertor, which lamp advantageously lights through the index of the scale of measuring unit. If a contact does not occur, the lamp connected to the output of the flip-flop indicator lights and indicates that the measuring unit is ready for measurement, i.e. in fact the switch-over of the set of the chosen measuring unit. The switches 18 and 21, or 25, serve only for the switchover of the common electronic part to the chosen measuring unit and the corresponding indicator.

We claim:

1. Apparatus for detecting sagittal depth and average curvature of gel contact lenses comprising a first and second measuring unit, each of which having a fixed support plate, a hollow conductive screw post fixedly secured to said support plate and extending perpendicular thereto, a rotatable lens support comprising a central boss and an integral disc extending radially therefrom, said boss being matingly threaded on said screw post, the boss of said first unit being formed of a frontal face adapted to receive a lens thereon about its peripheral edge, the nut of said second measuring unit being formed of an annular edge of a diameter adapted to seat the lens thereon substantially about the periphery of the corneal part of said lens, a conductive wire insulatingly secured in fixed position coaxially within said screw and extending outwardly of the end thereof by a predetermined distance, said conductive wire extending freely through said boss in opposition to the center of said lens, said lens being movable toward and away from the tip of said wire on rotation of said lens support, and an electronic conductivity indicator having a pair of inputs connected respectively to said conductive screw post and said conductor wire and forming a circuit on engagement of said lens with said wire.

2. The apparatus according to claim 1 including scale means located on said radially extending disc of said lens support.

3. The apparatus according to claim 1, wherein said screw post is threaded in said support plate and adjustably secured thereto by a nut threaded thereon.

4. The apparatus according to claim 1, including mutually engageable stop means on said fixed support plate and said rotatable lens supporting limiting the rotation of said lens support to approximately one revolution about said screw.

5. The measuring set according to anyone of claims 1, 2, 3 or 4, wherein the electronic conductivity indicator comprises a flip-flop amplifier, the input of which is connected with each of the first and second measuring units and the outputs of which are connected with indicators corresponding respectively thereto, said indicators and said measuring units being connected with switch means for the selective changeover of their function.

6. The apparatus according to anyone of claims 1, 2, 3 or 4, wherein the lead of the hollow screw of the first measuring unit is 1 to 2.5 mm per one revolution and the mutual position of the frontal face of the rotatable lens support and the protruding end of the wire conductor is at most 4.5 mm within the limits of one revolution, and the lead of the screw of the second measuring unit is 0.6 to 1.25 mm of the distance of the protruding end of the wire conductor above the plane and the supporting edge is at most 2.7 mm within the limits of one revolution.

7. The apparatus according to claim 1, wherein said conductor wire is secured within a non-conductive plug bushing, secured with said screw post and extending substantially along its length.

8. The apparatus according to claim 1, including a non-conductive plug bushing secured in said nut, said bushing having a bore through which said conductor wire freely passes.

* * * * *